US008146427B2

(12) United States Patent
Retz

(10) Patent No.: US 8,146,427 B2
(45) Date of Patent: Apr. 3, 2012

(54) VIBRATING WIRE ICE INDICATOR

(75) Inventor: Patrick William Retz, Oxon (GB)

(73) Assignee: Siemens Plc, Frimley, Camberley (GB)

( * ) Notice: Subject to any disclaimer, the term of this patent is extended or adjusted under 35 U.S.C. 154(b) by 65 days.

(21) Appl. No.: 12/698,723

(22) Filed: Feb. 2, 2010

(65) Prior Publication Data

US 2010/0201379 A1 Aug. 12, 2010

(30) Foreign Application Priority Data

Feb. 3, 2009 (GB) .................................. 0901644.5
Jan. 11, 2010 (GB) .................................. 1000354.9

(51) Int. Cl.
*G01H 17/00* (2006.01)
*G01H 24/00* (2006.01)
*F17C 3/08* (2006.01)

(52) U.S. Cl. .......................................... 73/570; 62/45.1

(58) Field of Classification Search ........................ None
See application file for complete search history.

(56) References Cited

U.S. PATENT DOCUMENTS

| | | | | |
|---|---|---|---|---|
| 4,568,922 | A | 2/1986 | Schwippert et al. | |
| 5,684,276 | A | 11/1997 | Altemir | |
| 6,828,889 | B1 * | 12/2004 | Zaput | 335/216 |
| 7,194,902 | B1 * | 3/2007 | Goodwin et al. | 73/152.24 |
| 7,574,898 | B2 * | 8/2009 | Harrison et al. | 73/54.41 |

FOREIGN PATENT DOCUMENTS

| | | | |
|---|---|---|---|
| GB | 2 412 742 | A | 10/2005 |
| GB | 2 413 173 | A | 10/2005 |
| GB | 2 421 299 | A | 6/2006 |
| GB | 2 421 573 | A | 6/2006 |

OTHER PUBLICATIONS

GB Search Report, Dated Apr. 7, 2009, 2 pages.
GB Search Report, Dated Jan. 22, 2010, 2 pages.

* cited by examiner

*Primary Examiner* — Roberto Velez
(74) *Attorney, Agent, or Firm* — Crowell & Moring LLP

(57) ABSTRACT

The present invention provides a sensor for detecting the build up of frozen deposits in a cryogen vessel housing a superconducting magnet, comprising a tensioned wire, a source of variable frequency alternating current and a voltage sensor. The tensioned wire is oriented perpendicular to the direction of the stray magnetic field produced by the superconducting magnet. By varying the frequency of the applied current, the resonant frequency of the tensioned wire may be detected as the frequency at which the voltage across the wire is a maximum. Any variation in the frequency or magnitude of the resonant peak may be interpreted as an indication of a frozen deposit hampering the free oscillation of the tensioned wire.

7 Claims, 4 Drawing Sheets

Prior Art

VIBRATING WIRE ICE INDICATOR

The present invention relates to methods and apparatus for detection of air ingress into cryogen vessels. It is particularly related to the detection of air ingress into cryogen vessels used to cool superconducting magnets used in imaging systems such as magnetic resonance imaging, nuclear magnetic resonance imaging and nuclear magnetic spectroscopy. The invention, however, may be applied to the detection of air ingress into any cryogen vessel.

BACKGROUND OF THE INVENTION

FIG. 1 shows a conventional arrangement of a cryostat including a cryogen vessel 12. A cooled superconducting magnet 10 is provided within cryogen vessel 12, itself retained within an outer vacuum chamber (OVC) 14. One or more thermal radiation shields 16 are provided in the vacuum space between the cryogen vessel 12 and the outer vacuum chamber 14. In some known arrangements, a refrigerator 17 is mounted in a refrigerator sock 15 located in a turret 18 provided for the purpose, which in this case is shown on the side of the cryostat. The refrigerator 17 provides active refrigeration to cool cryogen gas within the cryogen vessel 12, in some arrangements, by recondensing it into a liquid. The refrigerator 17 may also serve to cool the radiation shield 16. As illustrated in FIG. 1, the refrigerator 17 may be a two-stage refrigerator. A first cooling stage is thermally linked to the radiation shield 16, and provides cooling to a first stage temperature, typically in the region of 50-100K. A second cooling stage provides cooling of the cryogen gas to a much lower temperature, typically in the region of 4-10K and may recondense the gas into liquid state.

A negative electrical connection 21*a* is usually provided to the magnet 10 through the body of the cryostat. A positive electrical connection 21 is usually provided by either a conductor passing through the vent tube 20 or conduction through a component of turret 19.

For fixed current lead designs, a separate vent path (auxiliary vent) (not shown in FIG. 1) may be provided as a fail-safe vent in case of blockage of the vent tube 20.

The cryogen 15 is typically liquid helium at a temperature of about 4K, although other cryogens may be used such as liquid hydrogen, liquid neon or liquid nitrogen. At service intervals, it may be necessary to remove the refrigerator 17, and to open the vent tube 20. There is a risk that air could enter the cryogen vessel when the refrigerator is removed, or when the vent tube 20 is opened. Furthermore, experiments have shown that air continually diffuses into the cryogen vessel through the quench valve, and the vent valve, each conventionally provided on cryogen vessels, despite the cryogen vessel being held at positive pressure. Positive pressure means that the pressure of gas within the cryogen vessel is in excess of atmospheric pressure, so that any leak will primarily leak cryogen gas out of the cryogen vessel, rather than allow air to enter the cryogen vessel.

If air enters the cryogen vessel, it will freeze onto the coldest surfaces. With higher-boiling-point cryogens, such as nitrogen, only the water contained in air may be frozen. This may block the access between refrigerator and the cryogen vessel or, degrade the performance of the refrigerator, leading to a rise in temperature and pressure within the cryogen vessel, in turn leading to increased consumption of cryogen. The frozen deposit may also build up around the vent tube 20. The vent tube allows boiled-off cryogen gas to escape from the cryogen vessel, and is particularly important in the case of a magnet quench. During a magnet quench, a superconductive magnet suddenly becomes resistive, and loses all of its stored energy to the cryogen. This results in very rapid boil-off of cryogen. If the vent tube is constricted, or even blocked, then dangerously high pressure may build up within the cryogen vessel.

Removing a frost deposit from the inside of the cryogen vessel may require removing all of the cryogen and allowing the cryogen vessel and the magnet or other equipment within it to warm up—for example, to room temperature. This is a time consuming and costly process, as the removed cryogen will need to be replenished, and, in the case of a superconducting magnet, a shimming operation may need to be performed to correct any changes in magnetic field homogeneity which may have been brought about by the warming and re-cooling of the magnet. During this whole process, the apparatus cooled within the cryogen vessel, and the system of which it forms a part, is unusable. This may have consequential effects such as not being able to image patients, and their maladies remaining undiagnosed. Further cost implications are involved due to a very expensive imaging system being unavailable for a considerable period of time. It is therefore not practical to warm the cryogen vessels and their contents as a preventative service operation. However, by not performing such preventative measures, the danger of blockages and excessive cryogen pressures remains.

The present invention aims to provide apparatus and methods for detecting the presence of frost inside the cryogen vessel. The presence of a frost may then be signalled to a user or a service technician, and corrective action may be planned for a convenient time in order to remove the frost—for example by warming of the cryogen vessel.

Other objects, advantages and novel features of the present invention will become apparent from the following detailed description of the invention when considered in conjunction with the accompanying drawings.

DETAILED DESCRIPTION OF THE INVENTION

The present invention provides equipment for detecting the presence of frozen deposits in a cryogen vessel, using the physical effect that a length of tensioned wire will resonate when an alternating current is passed through it, in the presence of a static magnetic field if the frequency of the current matches the natural frequency of the wire. For a given wire material this frequency will depend critically on the inverse of the free length of the wire.

This principle of a current-carrying wire vibrating in a background magnetic field has been used extensively in viscometer designs. The present invention applies this effect to the detection of frozen deposits in cryogenic vessels of superconducting magnets. In operation, the stray field of the superconducting magnet provides the constant background magnetic field for the vibrating wire sensor.

Figure 2:
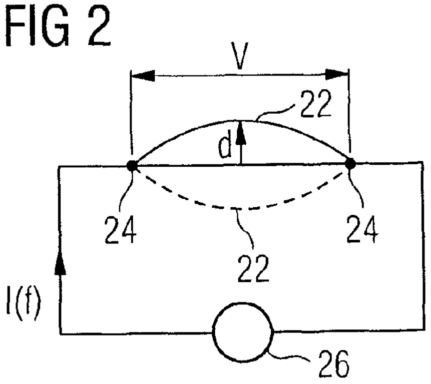
FIG. 2 shows an electrical schematic drawing of a circuit for detecting frozen deposits, according to an aspect of the present invention.

FIG. 2 schematically illustrates an electrical circuit of an embodiment of the present invention. A wire 22 is held under tension between two fixing points 24. An alternating current l(f), of frequency f, is provided by current source 26 and applied through the wire 22. The background magnetic field, provided by the superconductive magnet, is perpendicular to the plane of the drawing. The voltage V across the wire may be monitored in order to detect resonance. In response to the interaction of the alternating current and the background magnetic field, the wire will begin to oscillate. The magnitude d of oscillation is greatly exaggerated in the drawing.

Figure 3:
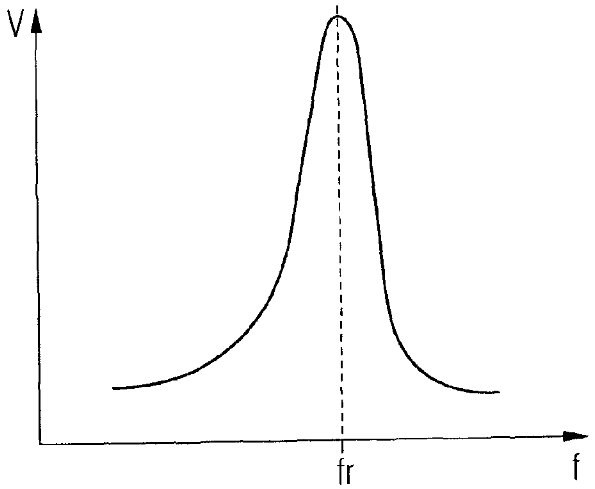
FIG. 3 schematically illustrates a resonance curve, illustrating the variance of the voltage across the oscillating wire of FIG. 2 as the frequency of an applied current is swept through the resonant frequency of the wire.

FIG. 3 shows an example of a typical voltage V response to the frequency f of the alternating current l(f). The resonant frequency is shown at $f_r$. As shown in the drawing, the voltage is modified by the electromotive force induced in the wire due to its motion within the magnetic field, as the frequency f of the applied current l(f) approaches the natural (resonant) frequency $f_r$ of the tensioned wire. If the frequency f of the applied current l(f) is increased through the natural frequency $f_r$, the peak measured voltage V occurs at a frequency f corresponding to the resonant frequency. For wires of the type and length envisaged for measurement of deposits inside cryogen vessels of superconducting magnets, the frequency $f_r$ will typically be in the kHz range.

Once the resonant frequency has been determined, any variation in this resonant frequency may be detected. Such variation may be used to infer the presence of frozen deposits in the cryogen vessel. For example, a frozen deposit on the wire will reduce its resonant frequency, as the wire will be made heavier by the deposit. On the other hand, a frozen deposit may reduce the free length of the tensioned wire, which will increase the resonant frequency of the wire.

Figure 4:
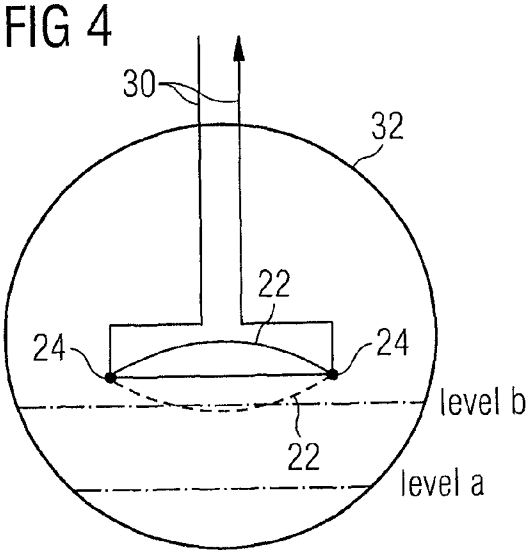
FIG. 4 shows an example placement of a vibrating wire sensor according to an embodiment of the present invention.

FIG. 4 illustrates an example sensor arrangement of the tensioned wire according to the present invention. Wire 22 is held under tension between fixing points 24 which are held a fixed distance apart. Electrical connections 30 are made to a voltage detector and a current source in a circuit similar to that of FIG. 2. The sensor is shown installed within a cross-section of a tube 32, representing a critical aperture within which it is desired to monitor the build-up of frozen deposits. The magnetic field from the superconducting magnet is perpendicular to the length of the wire.

When frozen deposits are absent, or are present to a level below the wire, for example to level a, the wire 22 is free to oscillate freely. The magnitude d of oscillation is greatly exaggerated in the drawing. The voltage V across the wire would peak at the natural frequency $f_r$ shown in FIG. 3. As frozen deposits build up and reach the level b, the deposits touch the wire, and cause damping of the oscillations and a change in resonant frequency. By applying the current l(f) through the illustrated spectrum of frequencies, a changed peak voltage may be detected. This may be interpreted as an indication that a frozen deposit has built up, and this may be signalled to an operator or a service technician. The oscillations will ultimately stop when the deposits become more extensive still, and no voltage peak will be observed at all.

Figure 5:
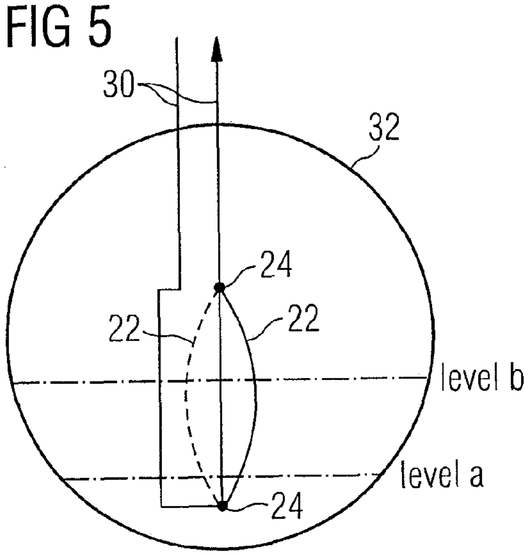
FIG. 5 shows another example placement of a vibrating wire sensor according to an embodiment of the present invention.

FIG. 5 illustrates another example arrangement of the tensioned wire sensor according to the present invention. Again, the magnetic field from the superconducting magnet is perpendicular to the length of the wire. Wire 22 is held under tension between fixing points 24 which are held a fixed distance apart. Electrical connections 30 are made to a voltage detector and a current source in a circuit similar to that of FIG. 2. This arrangement differs from the arrangement of FIG. 5 in that the tensioned wire is oriented vertically.

When frozen deposits are absent, or are present to a level below the wire, the wire 22 is free to oscillate freely. The voltage V across the wire would peak at the natural frequency $f_r$ shown in FIG. 3. As frozen deposits build up, for example to level a, the deposits touch the wire 22, and cause damping of the oscillations. This in effect causes a shortening free length of the tensioned wire, and a change in its resonant frequency. By applying the current l(f) through the spectrum of frequencies illustrated in FIG. 3, a peak voltage V may be detected at a higher frequency f. This may be interpreted as an indication that a frozen deposit has built up along part of the length of the tensioned wire, and this may be signalled to an operator or a service technician.

The resonant frequency of the tensioned wire will continue to rise as the level of deposits rises. The oscillations will ultimately stop when the deposits become more extensive still, and no voltage peak will be observed at all. When the deposits become very extensive, for example reaching level b, the oscillations may cease completely.

The advantage of the embodiment of FIG. 5 is that the progressive shortening of the wire provides a gradual change in resonant frequency, and provides an indication of the thickness of the frozen deposit, which may easily be derived from the cumulative change in resonant frequency of the tensioned wire. The embodiment of FIG. 4 provides a more basic indication of whether the frozen deposit has reached the height of the sensor wire.

The present invention accordingly provides a sensor for detecting the build up of frozen deposits in a cryogen vessel housing a superconducting magnet, comprising a tensioned wire, a source of variable frequency alternating current and a voltage sensor. The tensioned wire is oriented perpendicular to the direction of the magnetic field produced by the superconducting magnet. By varying the frequency of the applied current, the resonant frequency of the tensioned wire may be detected as the frequency at which the voltage across the wire reaches a peak. Any variation in the frequency or magnitude of the resonant peak may be interpreted as an indication of a frozen deposit hampering the free oscillation of the tensioned wire.

The frozen deposit sensor of the present invention provides an active measurement of the depth of frozen deposit. The sensor itself is very small and very simple, being only a tensioned wire and using the background field of the superconducting magnet. Electrical power dissipation of the sensor can be made extremely small by suitable choice of wire type and dimensions, and magnitude of the applied alternating current.

While operation of the sensor of the present invention has been described by applying an alternating electrical current through the wire, and varying the frequency of the current through a certain spectrum, an alternative method of operation may be as follows. An alternating current of a frequency corresponding to the approximate expected resonant frequency of the wire may be applied. The actual resonant frequency may be determined by monitoring the voltage V across the wire, and varying the frequency of the applied alternating current until a maximum value of voltage V is detected. Intermittently, or constantly, the applied alternating current may be varied slightly in frequency, to ensure that its frequency tracks the resonant frequency of the tensioned wire. A data output from the alternating current generator may be employed to indicate the resonant frequency of the tensioned wire.

Having explained the present invention in general terms, some more specific examples of possible embodiments will be discussed.

Figure 6:
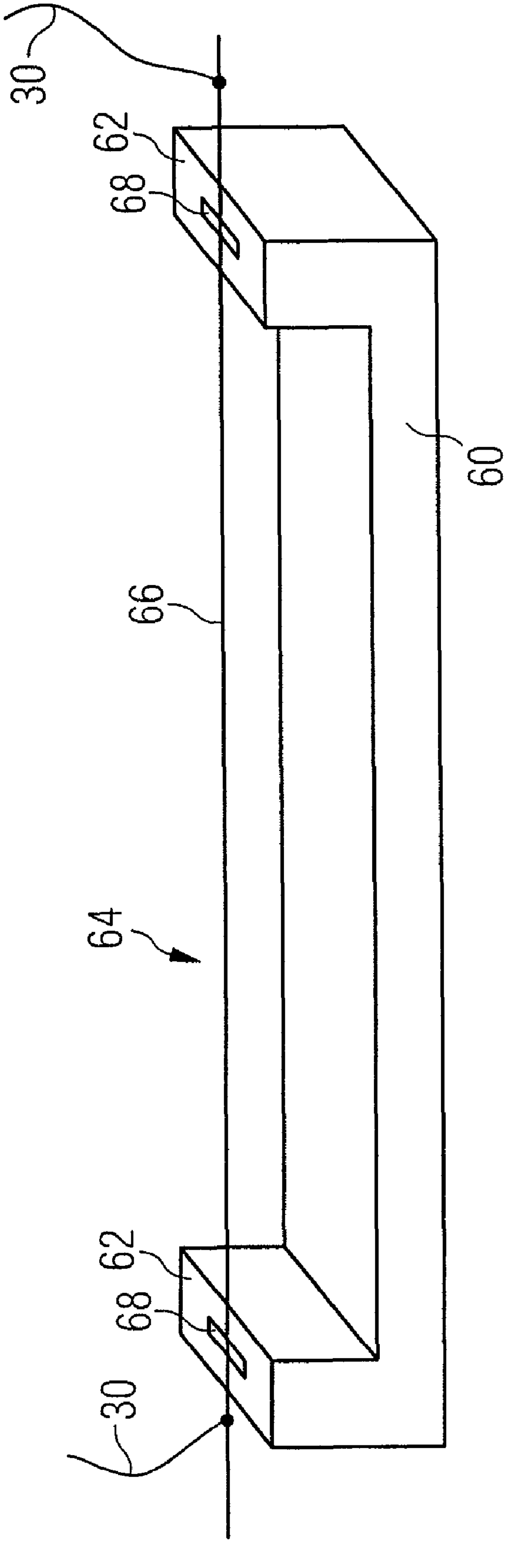
FIG. 6 shows an example of a tensioned wire sensor useful in an embodiment of the present invention.

FIG. 6 shows an example of a tensioned wire sensor useful in an embodiment of the present invention. A solid, essentially U-shaped base 60 has two upper plinths 62, separated by a gap 64. A wire 66 extends under tension between the two plinths 62, and is retained to each plinth by respective gripping means 68. The gripping means may be mechanical clamps which also serve to electrically isolate the wire from the plinths. In an example method of manufacture, U-shaped base 60 is formed by a non-magnetic metal extrusion sufficiently rigid to maintain the wire under tension. A length of wire 66 is attached to one plinth by a first gripping means, and a tension, of for example about 5N, is applied to the wire. The second gripping means is then applied to the wire to hold it in position and under tension. The wire may then be cut to length. A convenient way of achieving a desired and repeatable tension in the wire is to hold it, and the base 60, vertically, and suspend a certain mass from it. For example, a mass of about 0.5 kg will provide a repeatable and simple way of achieving a tension of about 5N.

Electrical connection must be made to the tensioned wire. This may be achieved directly to the wire, for example by soldering or crimping connecting wires 30. Alternatively, the connection may be achieved indirectly by electrical connection to part of the gripping means in contact with the wire.

Figure 1:
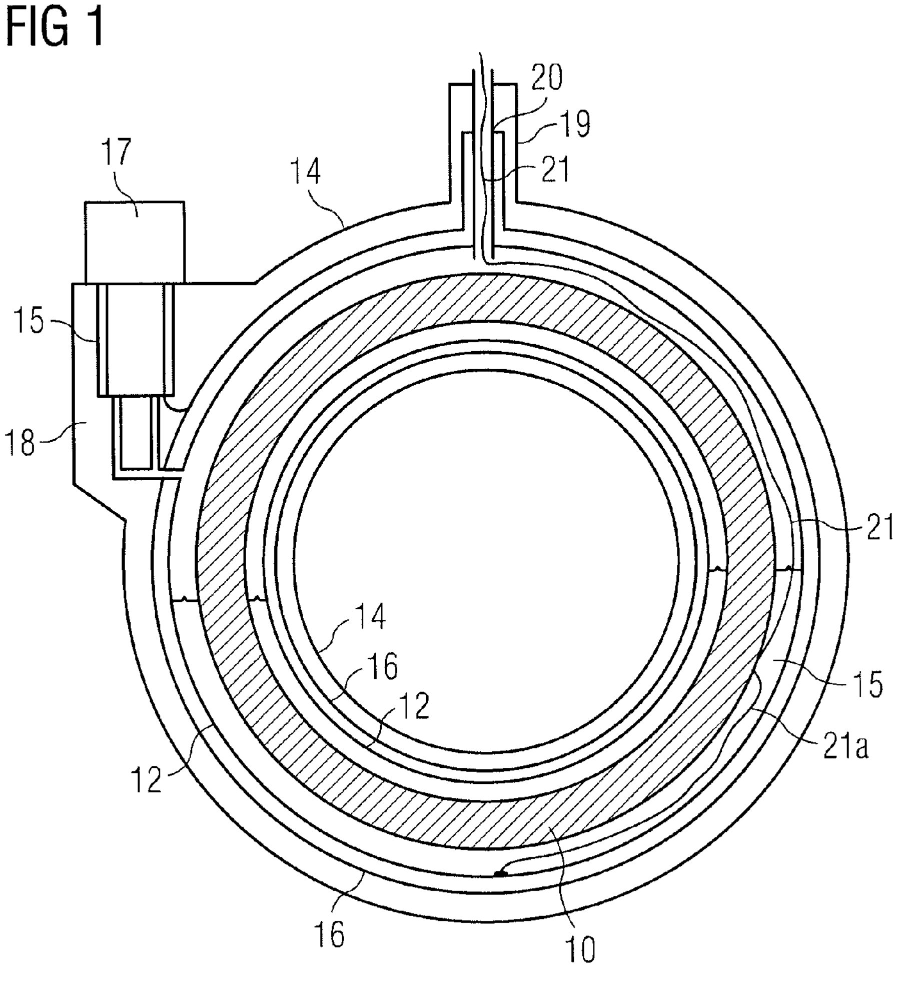
FIG. 1 shows a conventional arrangement of a cryostat including a cryogen vessel.
Figure 7:
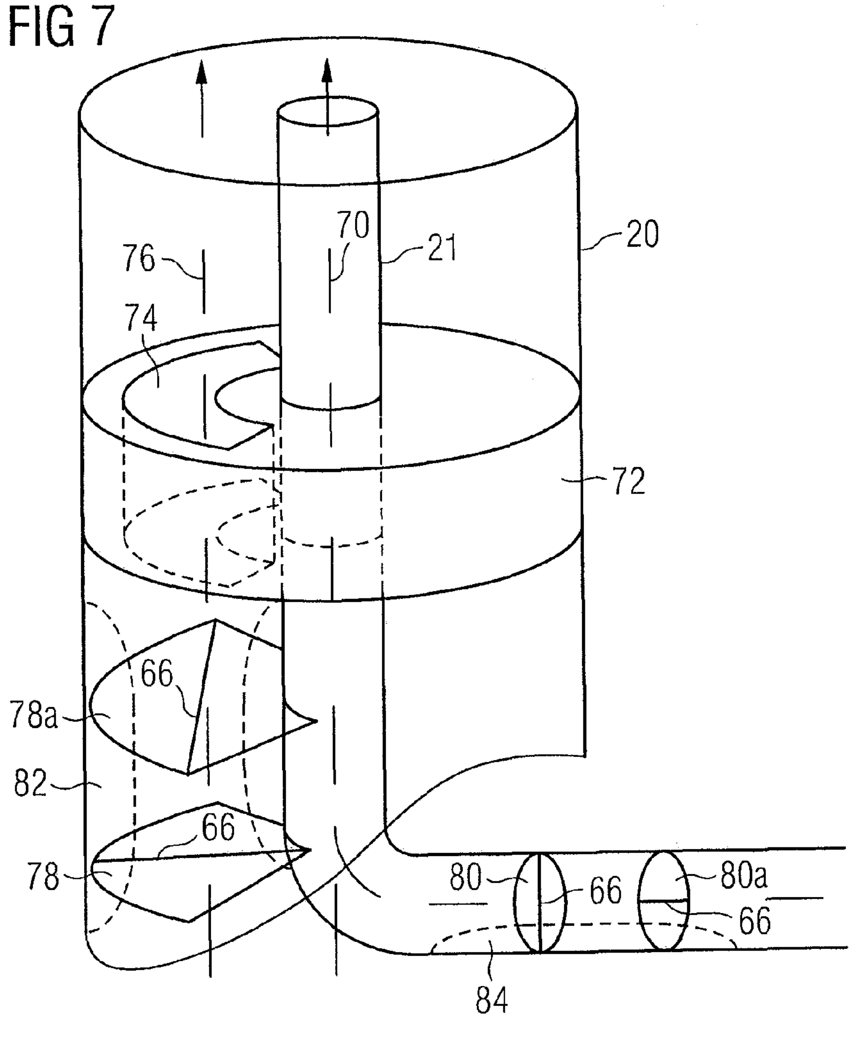
FIG. 7 shows possible locations for placement of a tensioned wire sensor.

FIG. 7 schematically illustrates possible locations for placement of a tensioned wire sensor within a cryogen vessel, according to certain embodiments of the present invention. FIG. 7 schematically represents a part of the vent tube 20 and part of positive electrical connection 21 as housed within turret 19, as represented in FIG. 1. According to the illustrated arrangement, the positive electrical connection 21 is tubular, and the passageway through the hollow electrical connection is arranged to serve as a vent path 70, to allow egress of cryogen in the case of a quench, should a main vent path 76 be unable to cope with a required rate of cryogen egress. The positive electrical connection 21 is retained and supported within the vent tube 20 by a support 72. This may be a thermally conductive support, and may assist in cooling of the positive electrical connection 21, although that does not form part of the invention. At least one through-hole 74 is provided through the support, to allow cryogen to pass the support, both as the cryogen vessel is filled, and when leaving the cryogen vessel, for example as a result of a quench. The annular cross-sectional passage formed between the positive electrical connection 21 and the vent tube 20 forms the main vent path 76 for egress of cryogen.

For safety, it is essential that at least one of the vent paths 70, 76, remains essentially clear of frozen deposits, so that cryogen may easily escape from the cryogen vessel in case of a quench. Should both vent paths become blocked, any quench will lead to a very dangerous build-up of pressure within the cryogen vessel.

According to an embodiment of the present invention, a tensioned wire sensor 78 may be placed within the main vent path 76 and/or a tensioned wire sensor 80 may be placed within the vent path 70. As illustrated, the tensioned wire 66 may be positioned horizontally, in a vertically-oriented part of the main vent passage 76, and the tensioned wire 66 may be positioned vertically within a horizontally-oriented part of vent passage 70. That is, the tensioned wires may be oriented in the expected direction of accretion of frozen deposit. Example accretions of frozen deposits are shown in phantom at 82 and 84. Both of these arrangements will operate in a manner similar to that discussed with reference to FIG. 5: that is, the accretion of frozen deposit will progressively damp the vibration of the tensioned wire, providing an indication of the thickness of the frozen deposit. Alternatively, the tensioned wire sensors may be arranged as shown at 78*a* and 80*a*, with the tensioned wires 66 arranged perpendicular to the expected direction of accretion of frozen deposit. These arrangements will operate in a manner similar to that discussed with reference to FIG. 4: that is, the accretion of frozen deposit will damp the vibration of the tensioned wire once it reaches a thickness sufficient to mechanically restrain oscillation of the wire, providing an indication of whether the thickness of the frozen deposit has reached the position of the wire.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Apparatus for detecting air ingress into a cryogen vessel, comprising:

a frozen deposit sensor;

a structure for holding said frozen deposit sensor in an air flow path, perpendicular to a magnetic field of said cryogen vessel;

wherein said frozen deposit sensor comprises a tensioned wire and a current source connected to pass an alternating current through said wire, to induce mechanical resonance therein.

2. Apparatus according to claim 1, wherein the wire is held perpendicular to an expected direction of accretion of the frozen deposit.

3. Apparatus according to claim 1, wherein the wire is held in an expected direction of accretion of the frozen deposit.

4. Apparatus comprising:

a cryogen vessel;

a superconducting magnet housed in said cryogen vessel;

a frozen deposit sensor; and a structure for holding said frozen deposit sensor in a magnetic field generated by said superconducting magnet;

wherein said frozen deposit sensor comprises a tensioned wire that is arranged perpendicular to said magnetic field.

5. A method for detecting air ingress into a cryogen vessel, comprising the steps of:

a)—providing apparatus according to claim 1, the frozen deposit sensor being located at a position of interest within the cryogen vessel;

b)—applying an alternating current of a first frequency to the tensioned wire, and measuring a resulting voltage across the wire;

c)—varying the frequency of the alternating current through an expected resonant frequency of the wire, while measuring the resulting voltage across the wire;

d)—determining a resonant frequency of the wire as a frequency of the applied current at which the voltage across the wire is a maximum;

e)—repeating steps (b) to (d) and, in response to a determined resonant frequency differing from an initially determined resonant frequency, signaling the presence of a frozen deposit, thereby indicating air ingress into the cryogen vessel.

* * * * *

6. A method for detecting air ingress into a cryogen vessel, comprising the steps of:

a)—providing apparatus according to claim 1, the frozen deposit sensor being located at a position of interest within the cryogen vessel;

b)—applying an alternating current of a first frequency to the tensioned wire, and measuring a resulting voltage across the wire;

c)—varying the frequency of the alternating current through an expected resonant frequency of the wire, while measuring the resulting voltage across the wire;

d)—determining a resonant frequency of the wire as a frequency of the applied current at which the voltage across the wire is a maximum;

e)—varying the frequency of the alternating current through the wire about an initially determined resonant frequency, while measuring the resulting voltage across the wire, thereby detecting any variation in determined resonant frequency from the initially determined resonant frequency, and in response thereto, signaling the presence of a frozen deposit, thereby indicating air ingress into the cryogen vessel.

7. Apparatus for detecting an ingress of air into a cryogen vessel, said apparatus comprising:

a frozen deposit sensor; and a structure for holding said frozen deposit sensor in an air flow path of said cryogen vessel in an orientation that is perpendicular to a magnetic field of a cryogenic device within said cryogen vessel.

* * * * *